Figure 1:
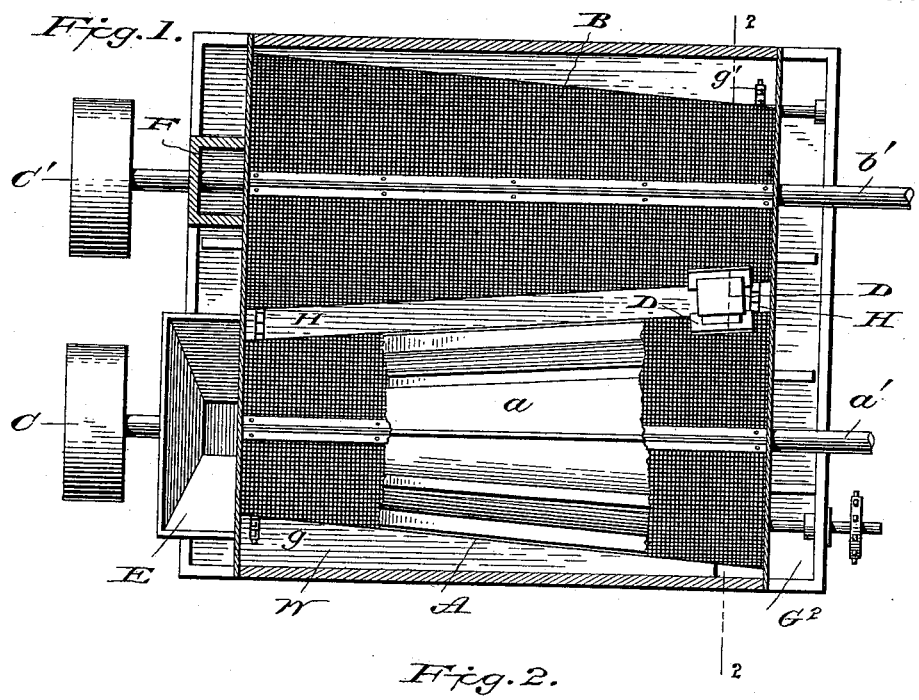

No. 635,748. Patented Oct. 31, 1899.
J. B. CORNWALL.
GRAIN SCOURER AND CONVEYER.
(Application filed July 1, 1898.)

(No Model.) 2 Sheets—Sheet 1.

WITNESSES
L. S. Elliott.
James B. Mansfield.

INVENTOR
John B. Cornwall
By Alexander Dowell
Attorneys

THE NORRIS PETERS CO., PHOTO-LITHO., WASHINGTON, D. C.

No. 635,748. Patented Oct. 31, 1899.
J. B. CORNWALL.
GRAIN SCOURER AND CONVEYER.
(Application filed July 1, 1898.)
(No Model.) 2 Sheets—Sheet 2.
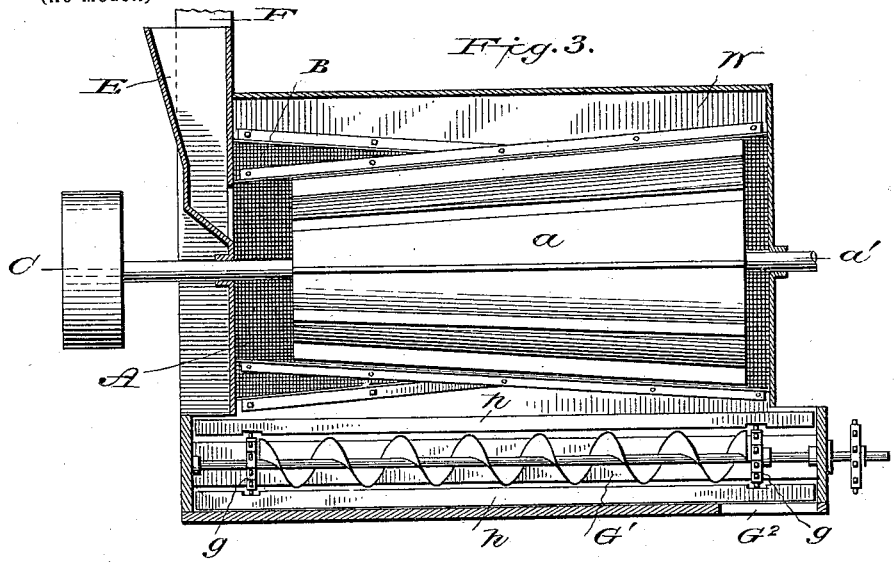
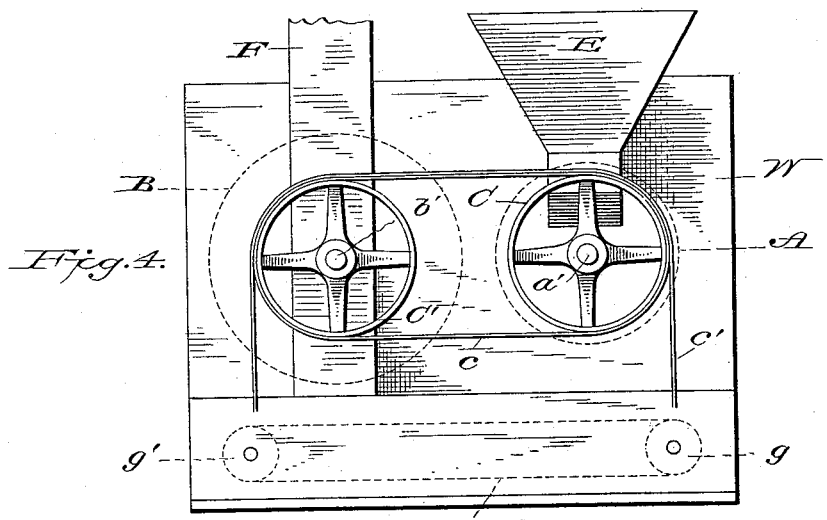
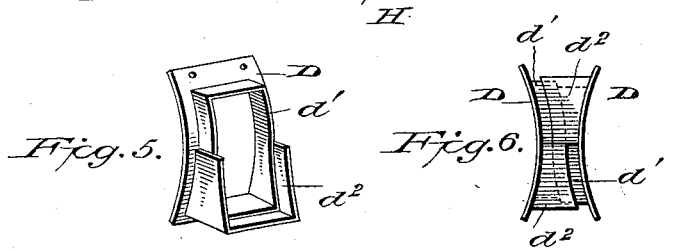
WITNESSES
L. S. Elliott.
James R. Mansfield
INVENTOR
John B. Cornwall
By Alexander Dowell
Attorneys

UNITED STATES PATENT OFFICE.

JOHN B. CORNWALL, OF MOLINE, ILLINOIS.

GRAIN SCOURER AND CONVEYER.

SPECIFICATION forming part of Letters Patent No. 635,748, dated October 31, 1899.

Application filed July 1, 1898. Serial No. 684,908. (No model.)

*To all whom it may concern:*

Be it known that I, JOHN B. CORNWALL, of Moline, in the county of Rock Island and State of Illinois, have invented certain new and useful Improvements in Grain Scourers and Conveyers; and I hereby declare that the following is a full, clear, and exact description thereof, reference being had to the accompanying drawings, which form part of this specification.

This invention is an improvement in grain scourers and conveyers.

The invention consists in two conical scourers arranged side by side in substantially the same horizontal plane within a flat-bottomed casing having a drag-belt and a screw conveyer in it, the cylinders being arranged with the small end of one opposite the large end of the other, so as to occupy the least space, and the large discharge end of one cylinder is connected to the small receiving end of the other by a detachable sectional coupling, and the grain discharged into the small end of one cylinder will travel the whole length thereof and be discharged laterally into the other cylinder and after traveling the whole length thereof will be discharged into a separating wind-trunk. The sectional coupling forms a spout through which the grain passes from one cylinder to the other and is so constructed that the cylinders can be readily detached when desired by shifting the position of the cylinders without unbolting the spout-sections. The drag-belt passes under the front or inner side of the conveyer-box, under the screw conveyer, and up over the top of the conveyer, the bottom of the conveyer-box being flush with the bottom of the chamber in which the drag-belt works. Thus the scourings can be discharged at any point in the length of the screw conveyer. The cylinders may be provided with ordinary scouring or beating drums, the particular construction of the latter not forming part of the present invention.

In the drawings the entire machine is not shown, the parts omitted not being essential in the present invention. Sufficient, however, is shown to enable the invention to be clearly understood, the essential features of the invention being the arrangement of the two scourers detachably coupled together and a flat-bottomed chamber or casing therefor, by which I am enabled to save a great deal of room, make the machine very low, and by the described construction of the drag belt and conveyer to remove the dust and scourings from the flat-bottomed chamber without the employment of sloping sides or cantboards. The accompanying drawings therefore show that portion of a grain-scourer which embodies the present invention, and therein—

Figure 2:
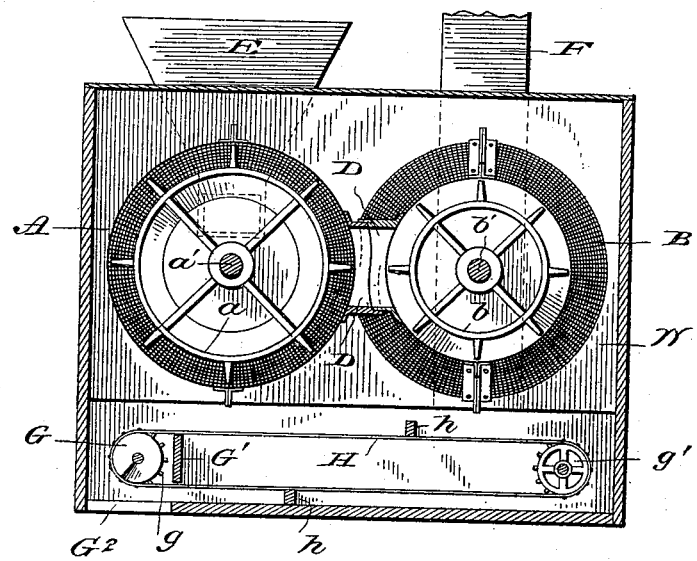

Figure 1 is a sectional plan view. Fig. 2 is a transverse section on line 2 2, Fig. 1. Fig. 3 is a sectional side elevation. Fig. 4 is a detail end elevation, and Figs. 5 and 6 are detail views of the coupling.

A and B designates two scouring-cylinders, conical in form, arranged side by side in the same horizontal plane within a casing W, having vertical side and end walls and a flat bottom, the cylinders being arranged as close to the bottom of the casing as will permit free movement of the drag conveyers thereunder. Within the scouring-cylinders are beaters or scouring-cones $a$ $b$, respectively mounted upon shafts $b'$ and $a'$, which are suitably journaled in the end walls of the casing and at one end are provided with pulleys C C', which are preferably belted together by a belt $c$, over which passes a driving-belt $c'$, as indicated in Fig. 4. The larger or discharge end of cylinder A is laterally connected to the small receiving end of cylinder B by means of a sectional spout-casting, which is made in two parts D D, that are alike, but reversed, so that one fits to the other.

Each part D of the spout-coupling has a curved base portion which is fitted and bolted to the screen, said portion having a central opening surrounded by an outstanding flange $d'$. Half of this flange is surrounded by a larger and still further projecting flange $d^2$. The flanges $d'$ abut when the castings are in position, and the scouring-cylinders are properly adjusted to each other, and the flanges $d^2$ then overlap the flanges $d'$, as indicated in Figs. 2 and 6, so that a close spout connection is formed between the cylinders, and said coupling prevents the longitudinal play of the cylinders in relation to each other. At the same time the cylinders can be readily detached from each other, as is obvious, as the parts of the coupling are readily separable.

Grain is fed into the small end of cylinder A from a hopper E and is discharged from the large end of cylinder B into the lower end of an air-trunk F, through which an upward current of air is drawn by a suitable fan. (Not shown.)

The screenings from the cylinders fall upon the flat bottom of the casing and are removed therefrom by means of a drag belt and conveyer.

A worm conveyer G is journaled at one side of and within the casing W, and on the conveyer-shaft are belt or sprocket pulleys $g$, over which run endless chains H, which also run over similar pulleys $g'$ at the opposite side of the casing. The pulleys H are provided with drags $h$, by which the material deposited on the floor is drawn to and under the conveyer G.

A board G' is arranged parallel with the conveyer, at the inner side thereof, and constitutes, with the adjoining side of the casing, a conveyer-box. The drags $h$ pass under the board G' and deliver material under the conveyer and onto the same as they rise thereover. In this manner all the material deposited upon the casing is brought to the conveyer and discharged thence through an opening $G^2$ in the bottom of the casing.

It will be observed from the foregoing that the scouring-cylinders are detachably connected by means of the coupling-castings D D, which form a spout or passage between the cylinders and at the same time hold or lock them together, and yet the cylinders are detachable without unbolting the castings. The screenings are delivered under the revolving conveyer G instead of over the top of the conveyer-box, and the entire machine contains a larger amount of scouring-surface, is more compact and economical in construction, and requires less power to operate it than the arrangement of double scourers heretofore employed. This arrangement also enables me to locate upon the casing of the scourer above the cylinders a grain-separator or other mechanism by which the grain may be prepared for the scourers, and in this way I am enabled to save floor-space and connecting mechanism and economize power in a mill.

Having thus described my invention, what I therefore claim as new, and desire to secure by Letters Patent thereon, is—

1. In a grain-scourer, the combination of a pair of scouring-cylinders arranged parallel and in the same plane, communicating with each other and respectively with a feed-inlet and discharge-outlet; with a flat-bottom casing in which said scourers are mounted, a conveyer at one side of said casing, a board at the inner side of said conveyer and conveyer belts and drags passing under and over the conveyer and board for directing material to and under the conveyer, substantially as described.

2. In a grain-scourer, the combination of two scouring-cylinders arranged side by side, respectively communicating at one end of the machine with a feed-inlet, and a discharge-outlet; and a sectional spout connecting the adjoining ends of said cylinders at the opposite ends of the machine, said spout being formed of two similar but opposite sections formed with interlocking flanges, said sections being respectively connected to the opposite cylinders, substantially as described.

3. In a scourer, the combination of two scouring-cylinders arranged side by side, respectively communicating at one end of the machine with a feed-inlet and discharge-outlet, and a spout connecting the ends of said cylinder at the opposite ends of the machine, with a flat-bottom casing in which said scourers are mounted, a screw conveyer at one side of said casing, and conveyer belts and drags passing under and over said conveyer and adapted to direct material to and under the screw conveyer, substantially as described.

4. In a scourer, the combination of the flat-bottom casing, two scouring-cylinders therein arranged side by side in a horizontal plane and respectively communicating at one end of the machine with a feed-inlet and discharge-outlet, and a sectional spout connecting the ends of said cylinder at the opposite end of the machine, said spout being formed of two similar opposed sections formed with interlocking flanges and respectively connected to the opposite cylinders; with a screw conveyer at one side of said casing, and belts and drags for conveying material to and under the conveyer, the drags passing under and over the conveyer, substantially as described.

5. The combination in a scouring-screen of a casing, having a flat bottom, with a screw conveyer at one side of said casing, the endless chains or belts running over pulleys at opposite sides of the casing and drags on said belts adapted to pass under and over the conveyer and deliver material to and under the conveyer, substantially as described.

6. The combination in a scouring-screen of a casing, having a flat bottom, with a screw conveyer at one side of said casing, and a board beside said conveyer; with endless chains or belts running under and over pulleys on said conveyer-shaft and over pulleys at the opposite side of the casing and drags on said belts adapted to pass under said board and under and over the conveyer and deliver material to and under the conveyer, substantially as described.

7. In a grain-scouring machine the combination of a pair of conical scouring-cylinders arranged side by side; with a coupling, consisting of the opposite portions D each having a base $d$, projecting flange $d'$ and enlarged projecting flange $d^2$; the flanges $d^2$ being adapted to interlock with the flanges $d'$, for the purpose and substantially as described.

8. In a grain-scouring machine, the combination of a pair of conical scouring-cylinders arranged side by side, in the same horizontal plane, within a flat-bottom casing, the larger end of one cylinder being opposite the smaller end of the other; with a sectional spout formed of separate interlocking parts D, D, substantially as described, connecting the adjoining ends of said scouring-cylinders, a feed-hopper for supplying grain to the small end of one cylinder, and an air-trunk communicating with the outlet at the larger end of the other cylinder, for the purpose and substantially as described.

9. The combination in a grain-scourer, of a pair of conical scouring-cylinders arranged side by side, in the same horizontal plane, within a flat-bottom casing, the larger end of one screen being opposite the small end of the other; and a sectional spout formed of separate interlocking parts substantially as described, connecting the adjoining ends of said cylinders; with a screw conveyer at one side of the casing, a board beside said conveyer, the endless chains or belts and drags attached thereto adapted to direct material to and under said board and conveyer, a feed-hopper for supplying grain to the small end of one cylinder opposite the spout, and an air-trunk communicating with the outlet at the large adjoining end of the other cylinder, substantially as described.

In testimony that I claim the foregoing as my own I affix my signature in presence of two witnesses.

JOHN B. CORNWALL.

In presence of—
  J. S. LEAS,
  CHAS. A. BARNARD.